(12) United States Patent
Moro et al.

(10) Patent No.: US 10,530,427 B2
(45) Date of Patent: Jan. 7, 2020

(54) NON-TRANSITORY STORAGE MEDIUM ENCODED WITH COMPUTER READABLE INFORMATION PROCESSING PROGRAM, INFORMATION PROCESSING SYSTEM, INFORMATION PROCESSING APPARATUS, AND INFORMATION PROCESSING METHOD

(71) Applicant: NINTENDO CO., LTD., Kyoto-shi, Kyoto (JP)

(72) Inventors: Isao Moro, Kyoto (JP); Kotaro Hiromatsu, Kyoto (JP); Yoshifumi Masaki, Kyoto (JP); Takahiro Watanabe, Kyoto (JP)

(73) Assignee: Nintendo Co., Ltd., Kyoto (JP)

(*) Notice: Subject to any disclaimer, the term of this patent is extended or adjusted under 35 U.S.C. 154(b) by 197 days.

(21) Appl. No.: 14/837,522

(22) Filed: Aug. 27, 2015

(65) Prior Publication Data
US 2016/0380677 A1 Dec. 29, 2016

(30) Foreign Application Priority Data

Jun. 29, 2015 (JP) .................... 2015-129658

(51) Int. Cl.
*H04B 5/00* (2006.01)
*G06K 7/10* (2006.01)
(Continued)

(52) U.S. Cl.
CPC ............ *H04B 5/0056* (2013.01); *A63F 9/24* (2013.01); *A63F 13/40* (2014.09); *A63F 13/69* (2014.09);
(Continued)

(58) Field of Classification Search
None
See application file for complete search history.

(56) References Cited

U.S. PATENT DOCUMENTS

2002/0137557 A1 9/2002 Ishii et al.
2003/0014423 A1* 1/2003 Chuah ............... G06F 17/30607
(Continued)

FOREIGN PATENT DOCUMENTS

EP 2 497 552 A2 9/2012
EP 2 777 786 A2 9/2014
(Continued)

OTHER PUBLICATIONS

Search Report dated May 4, 2016 issued in corresponding European Application No. 15182619.5 (11 pgs.).

*Primary Examiner* — Zhitong Chen
(74) *Attorney, Agent, or Firm* — Nixon & Vanderhye, P.C.

(57) ABSTRACT

A non-transitory storage medium encoded with a computer readable information processing program executed by an information processing apparatus is provided. The information processing apparatus includes a communication portion which exchanges data with an information storage medium through near field wireless communication. The information processing program causes the information processing apparatus to perform the following acts. The acts include writing available content information in the information storage medium, reading the available content information from the information storage medium, and updating availability of a content based on the read available content information.

18 Claims, 13 Drawing Sheets

(51) Int. Cl.
*A63F 13/69* (2014.01)
*A63F 13/822* (2014.01)
*A63F 13/92* (2014.01)
*A63F 13/95* (2014.01)
*A63F 9/24* (2006.01)
*A63F 13/40* (2014.01)

(52) U.S. Cl.
CPC ............... *A63F 13/95* (2014.09); *G06K 7/10* (2013.01); *G06K 7/10316* (2013.01); *A63F 13/822* (2014.09); *A63F 13/92* (2014.09)

(56) References Cited

U.S. PATENT DOCUMENTS

| | | | |
|---|---|---|---|
| 2007/0060206 A1* | 3/2007 | Dam Nielsen | H04M 1/27455 455/566 |
| 2008/0058102 A1* | 3/2008 | Hato | A63F 13/10 463/35 |
| 2011/0098092 A1 | 4/2011 | Reiche, III | |
| 2012/0077593 A1* | 3/2012 | Sarmenta | A63F 3/00643 463/40 |
| 2014/0162785 A1 | 6/2014 | Reiche et al. | |
| 2014/0256430 A1 | 9/2014 | Matsumura | |
| 2015/0038238 A1 | 2/2015 | Momose et al. | |
| 2015/0199546 A1* | 7/2015 | Sato | G06K 7/10316 340/10.51 |

FOREIGN PATENT DOCUMENTS

| | | | | |
|---|---|---|---|---|
| JP | H08-332282 A | 12/1996 | | |
| JP | 2007-252677 | 10/2007 | | |
| JP | 2008-079664 | * 10/2008 | ............ | A63F 13/10 |
| JP | 2011-000167 A | 1/2011 | | |
| JP | 2014-057776 A | 4/2014 | | |
| JP | 2014-171678 | 9/2014 | | |
| JP | 2015-026211 A | 2/2015 | | |

* cited by examiner

| CARD IDENTIFICATION ID | 0001 | |
|---|---|---|
| IDENTIFICATION ID | POSSESSION FLAG | NOTATION |
| 00001 | 1 | ASIAN TABLE |
| 00002 | 0 | ASIAN CLOSET |
| 00003 | 0 | ASIAN CHEST |
| 00004 | 1 | ASIAN BED |
| 00005 | 0 | GRAND PIANO |
| 00006 | 0 | ROUND CHAIR FOR PIANO |
| 00007 | 0 | EUROPEAN TABLE |
| 00008 | 0 | EUROPEAN CLOSET |
| 00009 | 0 | EUROPEAN BED |
| 00010 | ... | ... |

| OBJECT IDENTIFICATION ID (310) | POSSESSION FLAG (312) | NOTATION (314) | WRITE PERMISSION FLAG (316) |
|---|---|---|---|
| 00001 | 1 | ASIAN TABLE | 1 |
| 00002 | 0 | ASIAN CLOSET | 0 |
| 00003 | 1 | ASIAN CHEST | 1 |
| 00004 | 1 | ASIAN BED | 1 |
| 00005 | 1 | GRAND PIANO | 0 |
| 00006 | 1 | ROUND CHAIR FOR PIANO | 0 |
| 00007 | 0 | EUROPEAN TABLE | 0 |
| 00008 | 1 | EUROPEAN CLOSET | 1 |
| 00009 | 0 | EUROPEAN BED | 0 |
| 00010 | ... | ... | ... |

330: THE NUMBER OF TIMES OF WRITING 1

⇩

300D

| OBJECT IDENTIFICATION ID (310) | POSSESSION FLAG (312) | NOTATION (314) | WRITE PERMISSION FLAG (316) |
|---|---|---|---|
| 00001 | 1 | ASIAN TABLE | 1 |
| 00002 | 0 | ASIAN CLOSET | 0 |
| 00003 | 1 | ASIAN CHEST | 1 |
| 00004 | 1 | ASIAN BED | 1 |
| 00005 | 1 | GRAND PIANO | 1 ~317 |
| 00006 | 1 | ROUND CHAIR FOR PIANO | 1 ~317 |
| 00007 | 0 | EUROPEAN TABLE | 0 |
| 00008 | 1 | EUROPEAN CLOSET | 1 |
| 00009 | 0 | EUROPEAN BED | 0 |
| 00010 | ... | ... | ... |

330: THE NUMBER OF TIMES OF WRITING 2

FIG.13

| OBJECT IDENTIFICATION ID | POSSESSION FLAG | NOTATION | WRITING PROHIBITION FLAG |
|---|---|---|---|
| 00001 | 1 | ASIAN TABLE | 0 |
| 00002 | 0 | ASIAN CLOSET | 0 |
| 00003 | 0 | ASIAN CHEST | 0 |
| 00004 | 1 | ASIAN BED | 0 |
| 00005 | 0 | GRAND PIANO | 0 |
| 00006 | 0 | ROUND CHAIR FOR PIANO | 1 |
| 00007 | 0 | EUROPEAN TABLE | 0 |
| 00008 | 0 | EUROPEAN CLOSET | 0 |
| 00009 | 0 | EUROPEAN BED | 1 |
| 00010 | ... | ... | ... |
| ⋮ | ⋮ | ⋮ | ⋮ |

NON-TRANSITORY STORAGE MEDIUM ENCODED WITH COMPUTER READABLE INFORMATION PROCESSING PROGRAM, INFORMATION PROCESSING SYSTEM, INFORMATION PROCESSING APPARATUS, AND INFORMATION PROCESSING METHOD

This nonprovisional application is based on Japanese Patent Application No. 2015-129658 filed with the Japan Patent Office on Jun. 29, 2015, the entire contents of which are hereby incorporated by reference.

FIELD

The present technology relates to a non-transitory storage medium encoded with a computer readable information processing program making use of near field wireless communication, an information processing system, an information processing apparatus, and an information processing method.

BACKGROUND AND SUMMARY

A game machine which establishes contactless communication with an IC tag of a dedicated figure through a contactless communication portion, obtains data such as identification data, and displays a character in accordance with the obtained data on a display portion as a choice of a player character has conventionally been known.

The conventional technique has remained at information processing using identification data associated with the IC tag itself of the dedicated figure and has not been able to realize a wide range of information processing in accordance with applications.

One embodiment provides a configuration in which a wide range of information processing using near field wireless communication is realized among a plurality of information processing apparatuses.

An exemplary embodiment provides a non-transitory storage medium encoded with a computer readable information processing program executed by an information processing apparatus. The information processing apparatus includes a communication portion which exchanges data with an information storage medium through near field wireless communication. The information processing program causes the information processing apparatus to perform the following acts. The acts include writing available content information in the information storage medium, reading the available content information from the information storage medium, and updating availability of a content based on the read available content information.

The content may include an object in a virtual space managed through information processing.

The step of writing may include writing in the information storage medium, information on an object displayed on a screen, among objects in the virtual space.

The step of writing may include writing in the information storage medium, the information on the object displayed on the screen at the time when an instruction for writing is accepted, among the objects in the virtual space.

The content may include a content relating to a game.

The step of updating may include updating availability of the content based on content information determined in accordance with a type of the information storage medium, in addition to the available content information stored in the information storage medium.

The acts may further include outputting the updated availability of the content. The step of outputting may include outputting in an identifiable manner, by which of the available content information stored in the information storage medium and the content information determined in accordance with the type of the information storage medium each available content has become available.

The step of writing may include writing in the information storage medium, information on one content or a plurality of contents selected in response to a selection instruction, as the available content information.

The information storage medium may store management information for managing the number of times of reading in correspondence with the available content information. The step of reading may include reading the available content information from the information storage medium when the management information stored in the information storage medium satisfies a predetermined condition.

The step of writing may include changing the number of contents which can be included in the available content information in accordance with the number of times of writing or a frequency of writing of the available content information in the information storage medium.

The step of writing may include notifying a user when previously written available content information has not been read before the available content information is written in the information storage medium.

A content which is not permitted to be included in the available content information may be predetermined.

The near field wireless communication may be near field communication (NFC).

An exemplary embodiment provides an information processing system including first and second information processing apparatuses. Each of the first and second information processing apparatuses includes a communication portion which exchanges data with an information storage medium through near field wireless communication. The first information processing apparatus includes a writing module which writes available content information in the information storage medium. The second information processing apparatus includes a reading module which reads the available content information from the information storage medium and an updating module which updates availability of a content based on the read available content information.

An exemplary embodiment provides an information processing system that includes a communication portion which exchanges data with an information storage medium through near field wireless communication and a processing module. The processing module implements, by executing an information processing program, a writing module which writes available content information in the information storage medium, a reading module which reads the available content information from the information storage medium, and an updating module which updates availability of a content based on the read available content information.

An exemplary embodiment provides an information processing apparatus that includes a communication portion which exchanges data with an information storage medium through near field wireless communication, a writing module which writes available content information in the information storage medium, a reading module which reads the available content information from the information storage medium, and an updating module which updates availability of a content based on the read available content information.

An exemplary embodiment provides an information processing method performed by an information processing apparatus including a communication portion which exchanges data with an information storage medium through near field wireless communication. The information processing method includes writing available content information in the information storage medium, reading the available content information from the information storage medium, and updating availability of a content based on the read available content information.

An exemplary embodiment provides an information processing method performed between a first information processing apparatus and a second information processing apparatus. Each of the first and second information processing apparatuses includes a communication portion which exchanges data with an information storage medium through near field wireless communication. The information processing method includes writing available content information in the information storage medium by the first information processing apparatus, reading the available content information from the information storage medium by the second information processing apparatus, and updating availability of a content based on the read available content information by the second information processing apparatus.

The foregoing and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 11 shows an exemplary illustrative non-limiting drawing illustrating a configuration example for restricting the number of times of writing or a frequency of writing in the application to which information processing according to the present embodiment is applied.

FIG. 13 shows an exemplary illustrative non-limiting drawing illustrating a configuration example for restricting inclusion of a specific object in available content information, in the application to which information processing according to the present embodiment is applied.

DESCRIPTION OF THE PREFERRED EMBODIMENTS

Figure 1:
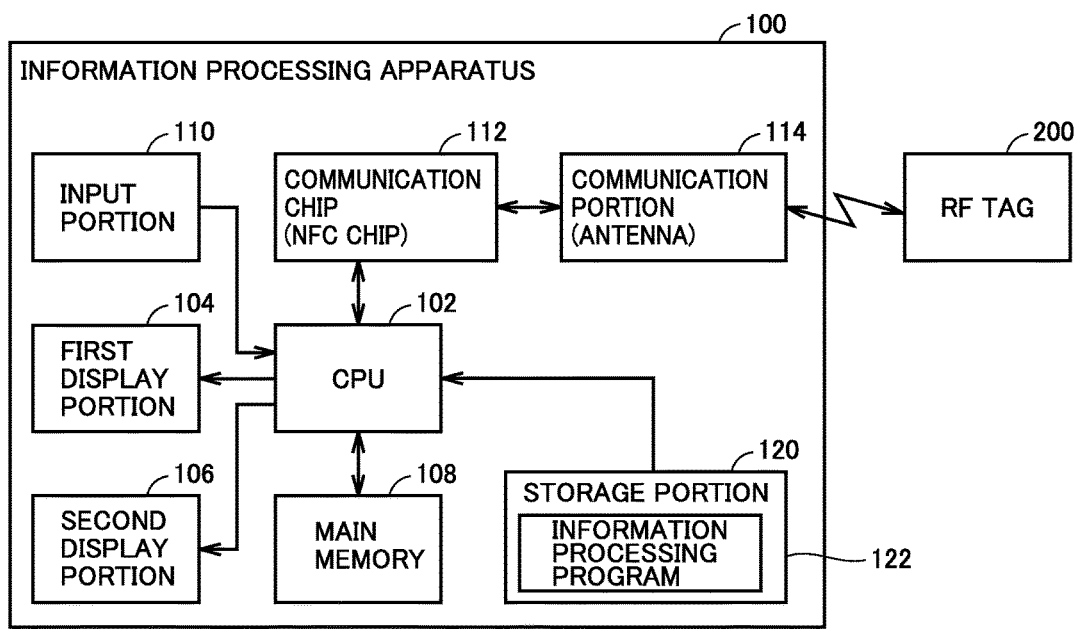
FIG. 1 shows an exemplary illustrative non-limiting drawing illustrating a configuration example of an information processing apparatus according to the present embodiment.

The present embodiment will be described in detail with reference to the drawings. The same or corresponding elements in the drawings have the same reference characters allotted and description thereof will not be repeated.

[A. Configuration of Information Processing Apparatus 100]

A configuration of an information processing apparatus 100 according to the present embodiment will initially be described.

Referring to FIG. 1, information processing apparatus 100 is any computer which can establish near field wireless communication with an RF tag 200 representing an information storage medium.

In the present embodiment, communication in compliance with near field communication (NFC) specifications between information processing apparatus 100 and RF tag 200 will be described by way of example of near field wireless communication.

Near field wireless communication according to the present embodiment may be NFC communication. Near field wireless communication encompasses, by way of example, any communication scheme in which radio waves (for example, electromagnetic induction) from one apparatus generate electromotive force in the other apparatus. The other apparatus can operate with generated electromotive force (the other apparatus may or may not have a power supply).

In near field wireless communication, communication can be established when information processing apparatus 100 and RF tag 200 are proximate to each other (typically, a distance therebetween is not greater then ten and several centimeters). In near field wireless communication, sending of radio waves continues while communication between two communication apparatuses is maintained (while another tag is proximate to a communication apparatus). Though a scheme of communication through radio waves is described by way of example, limitation thereto is not particularly intended. Optical communication or communication via other media may be applicable and a scheme is not limited.

Information processing apparatus 100 is any information processing apparatus which can establish near field wireless communication. In the present embodiment, information processing apparatus 100 may be, for example, a portable (also referred to as mobile) device such as a portable game device, a portable telephone, or a smartphone, a stationary device such as a personal computer or a home game console, or a large apparatus such as an arcade game machine. For example, information processing apparatus 100 may be a portable device having an NFC reader and writer function.

RF tag 200 is any device which can establish near field wireless communication with information processing apparatus 100. In the present embodiment, RF tag 200 is an information storage medium having a function as an NFC tag. Namely, the tag includes a circuit (an IC chip) establishing near field wireless communication and storage means for storing data (such as a memory). Namely, the tag is a radio frequency identification (RFID) including a readable and writable circuit. RF tag 200 may be a device having only a function to store data (an RF tag), or may be, for example, an information processing apparatus (a portable device) having an NFC card emulation function.

RF tag 200 may be contained in a card type housing (case) or in a figure.

Information processing apparatus 100 includes a central processing unit (CPU) 102, a first display portion 104, a second display portion 106, a main memory 108, an input portion 110, a communication chip 112, and a communication portion 114.

CPU 102 is a processing entity (processing means) for performing various types of information processing performed in information processing apparatus 100. CPU 102 reads an information processing program 122 stored in a storage portion 120 and develops the program on main memory 108, and performs information processing as will be described later.

First display portion 104 and second display portion 106 display an image and information generated as a result of information processing performed by CPU 102. In the present embodiment, though information processing apparatus 100 including a plurality of display portions is shown by way of example, it may have only a single display portion. Alternatively, information processing apparatus 100 may make use of one external display portion or a plurality of external display portions.

Input portion 110 accepts an instruction from a user or an external apparatus. Input portion 110 is typically implemented by various buttons, a control lever, a touch panel, or a mouse. Alternatively, various communication interfaces may implement input portion 110.

Communication chip 112 is a circuit which processes a wireless signal exchanged with RF tag 200, and typically mounted as an NFC chip. Communication portion 114 is implemented by an antenna used for near field wireless communication. More specifically, communication chip 112 generates radio waves or a signal sent from communication portion 114 in response to an instruction from CPU 102, and decodes a response signal from RF tag 200 received through communication portion 114. Thus, in information processing apparatus 100, CPU 102 executes information processing program 122 so as to implement a communication function to exchange data with RF tag 200 (information storage medium) via near field wireless communication through communication portion 114 and communication chip 112.

Storage portion 120 is any storage device (storage medium) which can be accessed by CPU 102. In addition to information processing program 122, storage portion 120 stores an application and an operating system. Storage portion 120 is mounted, for example, as a non-volatile storage medium such as a hard disk or a flash memory. Alternatively, storage portion 120 may be mounted, for example, as a storage medium attachable to or removable from information processing apparatus 100 such as an optical disc and a cartridge. In this case, an information processing system including information processing apparatus 100 and any storage medium may be implemented.

Information processing apparatus 100 may be implemented based on combination of a plurality of independent apparatuses. For example, a first apparatus including an element corresponding to CPU 102 and input portion 110 and a second apparatus including an element corresponding to communication chip 112 and communication portion 114 may be connected to each other in an attachable and removable manner. Such a configuration may be referred to as an information processing system instead of an information processing apparatus. Alternatively, such a configuration that a main body apparatus including an element corresponding to CPU 102 and an apparatus including input portion 110, first display portion 104, and second display portion 106 are separate from each other may be adopted.

In another embodiment, information processing apparatus 100 may be implemented by a main body apparatus and a terminal apparatus having input portion 110 as well as first display portion 104 and second display portion 106, or by a main body apparatus and an operation apparatus having input portion 110. Alternatively, information processing apparatus 100 may employ a television as a display apparatus, without including first display portion 104 and second display portion 106.

In another embodiment, at least a part of information processing performed in information processing apparatus 100 may be distributed among a plurality of apparatuses capable of communicating over a network (a wide area network and/or a local network).

[B. Overview]

Processing in the information processing system including a plurality of information processing apparatuses 100 according to the present embodiment will now generally be described. A user can enjoy information processing according to the present embodiment by using a plurality of information processing apparatuses 100. Typically, since information processing according to the present embodiment is performed as a plurality of information processing apparatuses 100 interact with one another, the entirety including the plurality of information processing apparatuses 100 is herein referred to as the "information processing system." It is not necessarily a case, however, that a system is clearly embodied. When information processing as will be described later is performed among information processing apparatuses 100 possessed by users as friends as well, those information processing apparatuses 100 can be regarded as constituting the "information processing system" according to the present embodiment.

Figure 2:
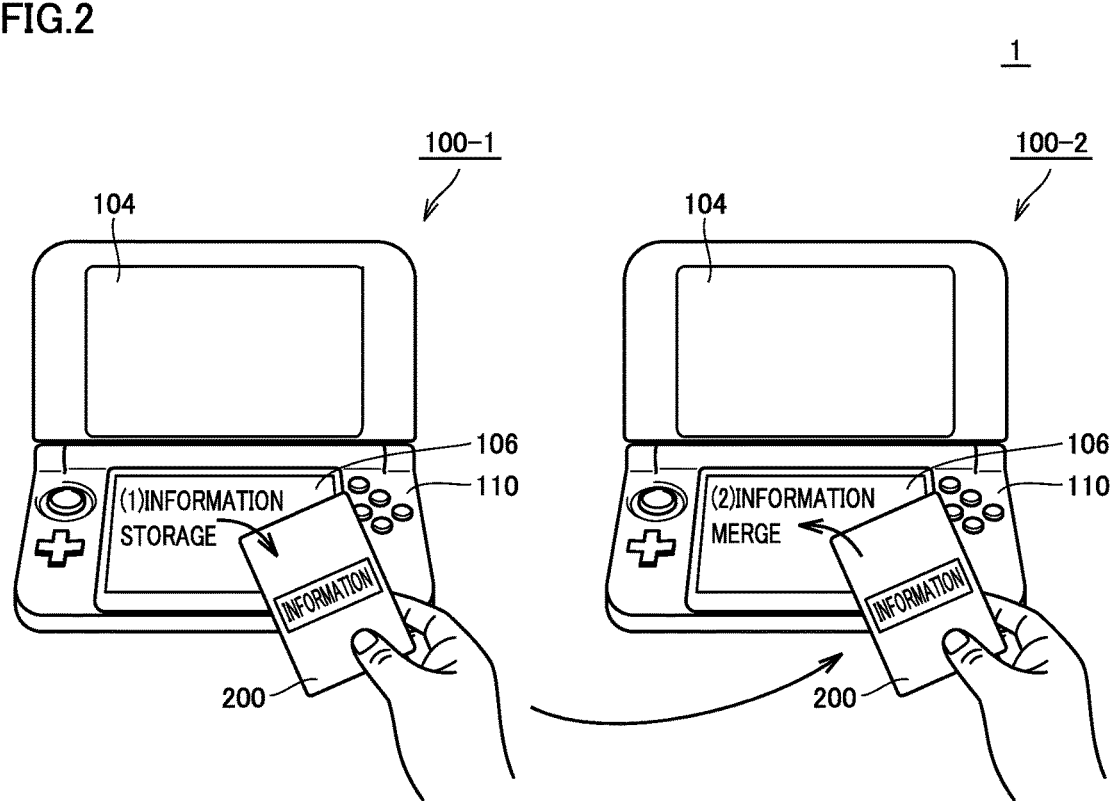
FIG. 2 shows an exemplary illustrative non-limiting drawing illustrating overview of processing in an information processing system according to the present embodiment.

Referring to FIG. 2, by way of example, an information processing system 1 constituted of an information processing apparatus 100-1 (a first information processing apparatus) and an information processing apparatus 100-2 (a second information processing apparatus) is exemplified.

As described above, each of information processing apparatuses 100-1 and 100-2 has a communication function to exchange data with RF tag 200 (information storage medium) through near field wireless communication.

As one form of information processing according to the present embodiment, when a user holds RF tag 200 over information processing apparatus 100-1, a part of information held by information processing apparatus 100-1 is written in RF tag 200 ((1) information storage). When the user holds RF tag 200 in which information has been written over information processing apparatus 100-2, information processing apparatus 100-2 reads the information stored in RF tag 200 and updates information held by information processing apparatus 100-2 itself with the read information ((2) information merge).

In the present embodiment, information exchanged through RF tag 200 may include available content information representing information, a type, or the number of contents which can be made use of in information processing apparatus 100-1 and information processing apparatus 100-2.

A "content" herein includes some kind of data or a set value used in information processing performed in information processing apparatuses 100-1 and 100-2. For example, when information processing relates to various communication applications, a content may include a character, an avatar, a stamp, a pictograph, a background image, or a background texture.

When information processing relates to various game applications, a content relating to a game may be included. In this case, a specific example of a content may include an object, an item (or a game item), a stage where users can play (or a hidden stage), or a mini game, in addition to those described above.

A case that an object used in an application is a content will mainly be described below by way of example.

[C. Application Example]

One example of an application to which information processing according to the present embodiment is applied will now be described. An application to which information processing according to the present embodiment is applied is a game application also categorized as a community simulation game. A user can operate one character or a plurality of characters in a virtual space within a game (a game space), perform activities using an object (for example, a game item), or communicate with a character in the game space or a character operated by another user.

FIGS. 3A to 3C and 4A to 4B show game processing in which each user uses an object which he/she holds and makes use of the object freely in the game space. More specifically, the user can freely arrange a furniture object held by the user himself/herself in a user's own house (or a room included therein). When a plurality of users play the game, the user can invite a character operated by another user to the house or the room created by the user himself/herself.

In the present embodiment, a furniture object is used as one example of a content. Namely, an object in a virtual space managed by a game application representing one example of information processing is employed as one example of a content.

Information processing apparatus 100 holds and manages availability of a furniture object freely arranged, that is, freely used, by each user. The furniture object which can be arranged by each user in his/her own house may be increased or decreased in number in accordance with various events in the game or with progress of the game. In the present embodiment, available content information includes information for specifying an available furniture object among furniture objects prepared in advance in the application.

In the present embodiment, content availability includes information indicating which object is available and/or which object is unavailable among the plurality of objects which are available in the application. In a specific data structure, information indicating availability or unavailability may be associated with each of the plurality of objects available in the application, only available objects may be listed, or only unavailable objects may be listed. Such availability of contents may be held and managed for each user or held and managed for each information processing apparatus 100.

In the present embodiment, specific identification information (hereinafter also referred to as "card identification information" for distinction from other types of identification information) is allocated to RF tag 200, and when a user holds any RF tag 200 over information processing apparatus 100 (strictly speaking, communication portion 114), information processing apparatus 100 can also have a character corresponding to card identification information stored in RF tag 200 appear in the game space. A character corresponding to card identification information allocated to each RF tag 200 may be depicted on a surface of RF tag 200.

Figure 3A:
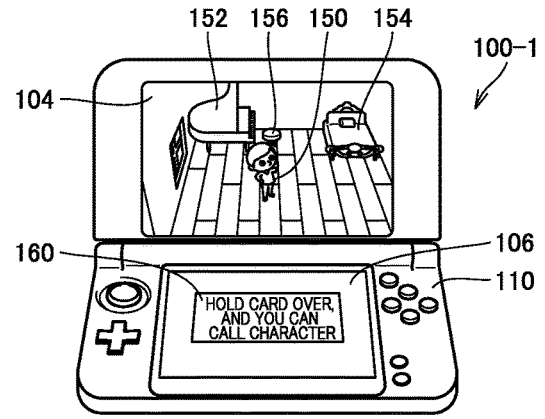
FIGS. 3A to 3C and 4A to 4B show exemplary illustrative non-limiting drawings illustrating examples of an application to which information processing according to the present embodiment is applied.

Referring to FIG. 3A, first display portion 104 of information processing apparatus 100-1 displays the game space, in which a main character 150 operated by a user is displayed. A room freely arranged by the user is expressed as the game space. The user of information processing apparatus 100-1 can arrange an object selected as appropriate from one furniture object or a plurality of furniture objects held by the user himself/herself at any position within the game space. In the example in FIG. 3A, three objects 152, 154, and 156 are arranged.

In the state shown in FIG. 3A, in information processing apparatus 100-1, a notification that a character can appear in the game space by bringing RF tag 200 closer to second display portion 106 is given. Namely, second display portion 106 displays a message 160 "hold card over, and you can call character."

Figure 3B:
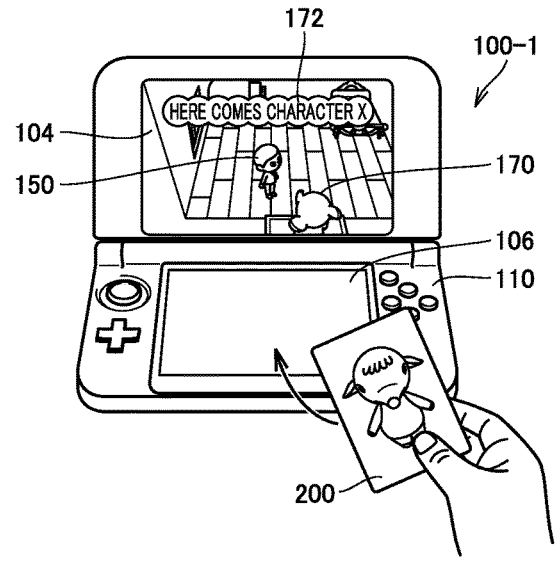

Here, as shown in FIG. 3B, when the user holds any RF tag 200 over information processing apparatus 100-1, such an effect that a character corresponding to card identification information stored in RF tag 200 appears in the game space is provided.

In information processing apparatus 100-1 according to the present embodiment, communication portion 114 (FIG. 1) is arranged at a position in proximity to second display portion 106. As RF tag 200 comes closer to second display portion 106, exchange of data between information processing apparatus 100-1 and RF tag 200 is started. As a result of this exchange of data, information processing apparatus 100-1 reads card identification information stored in RF tag 200. Then, information processing apparatus 100-1 specifies a guest character 170 corresponding to the read card identification information and embodies the guest character in the game space. As this guest character 170 appears, a message 172 "here comes character X" is displayed on first display portion 104.

Information processing apparatus 100-1 has a writing function to write information on an available furniture object into RF tag 200 representing the information storage medium, as available content information.

Figure 3C:
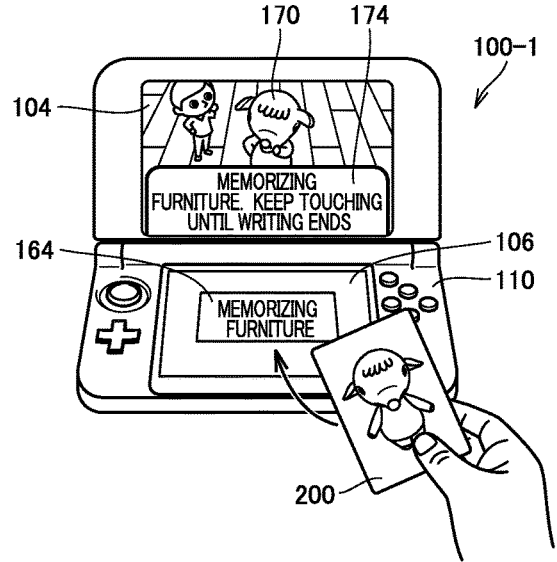

Here, as shown in FIG. 3C, when the user holds any RF tag 200 over information processing apparatus 100-1, information on an object representing one example of a content is written in RF tag 200. Namely, as RF tag 200 comes closer to second display portion 106, exchange of data between information processing apparatus 100-1 and RF tag 200 is started. As a result of this exchange of data, information processing apparatus 100-1 writes available content information into RF tag 200.

In the state shown in FIG. 3C, in information processing apparatus 100-1, a notification that available content information is being written into RF tag 200 brought closer to second display portion 106 is given. Specifically, first display portion 104 displays a message 174 "memorizing furniture" and "keep touching until writing ends." Second display portion 106 displays a message 164 "memorizing furniture".

A content written as being available into RF tag 200 may be the entirety or a part of a content which is available in information processing apparatus 100-1. In the example shown in FIGS. 3A to 3C, information on an object displayed on a screen of first display portion 104 or second display portion 106 among objects present in a relatively wide virtual space of the game (game space) may be written in RF tag 200 representing the information storage medium. For example, the user can freely arrange furniture objects in the user's own house. Here, there are a plurality of rooms in each user's house, and a character can freely move through the rooms in response to an operation by the user. Therefore, all of the furniture objects arranged in the plurality of rooms constituting each user's house may be defined as available content information, or limitation to only objects arranged in a specific room or to only objects actually viewed by the user may be made.

For example, as shown in FIG. 3C, when the user holds any RF tag 200 over information processing apparatus 100-1, an instruction for writing into RF tag 200 is accepted. Information processing apparatus 100 may write into RF tag 200 representing the information storage medium, only information on an object which is actually displayed on the screen at the time when an instruction for writing is accepted, among objects in the virtual space. Thus, by limiting objects to be written into RF tag 200 to those actually viewed by the user, the user can know at a glance information on which object has been written in RF tag 200.

Then, when the same user or another user holds RF tag 200 over another information processing apparatus 100-2, content information written in RF tag 200 is read and information is merged.

Figure 4A:
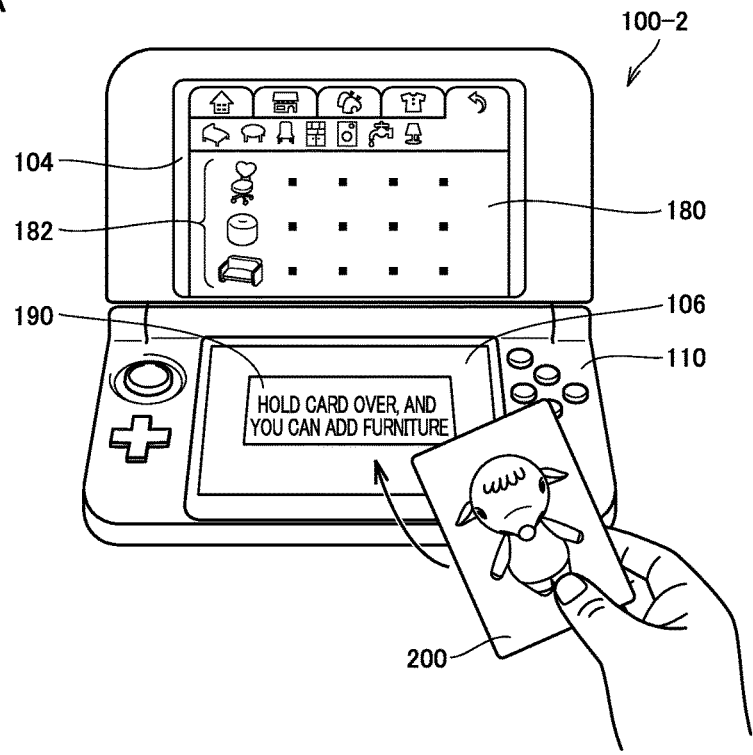

Referring to FIG. 4A, a list screen 180 showing a list of furniture objects available at the current time point in information processing apparatus 100-2 is displayed on first display portion 104 of information processing apparatus 100-2. In list screen 180 shown in FIG. 4A, three objects 182 are presented as being available.

Information processing apparatus 100-2 has a reading function to read information on available furniture objects as available content information from RF tag 200 representing the information storage medium. In the state shown in FIG. 4A, in information processing apparatus 100-2, a notification that information on available furniture objects stored in RF tag 200 can be read by bringing RF tag 200 closer to second display portion 106 is given. Namely, second display portion 106 displays a message 190 "hold card over, and you can add furniture."

Figure 4B:
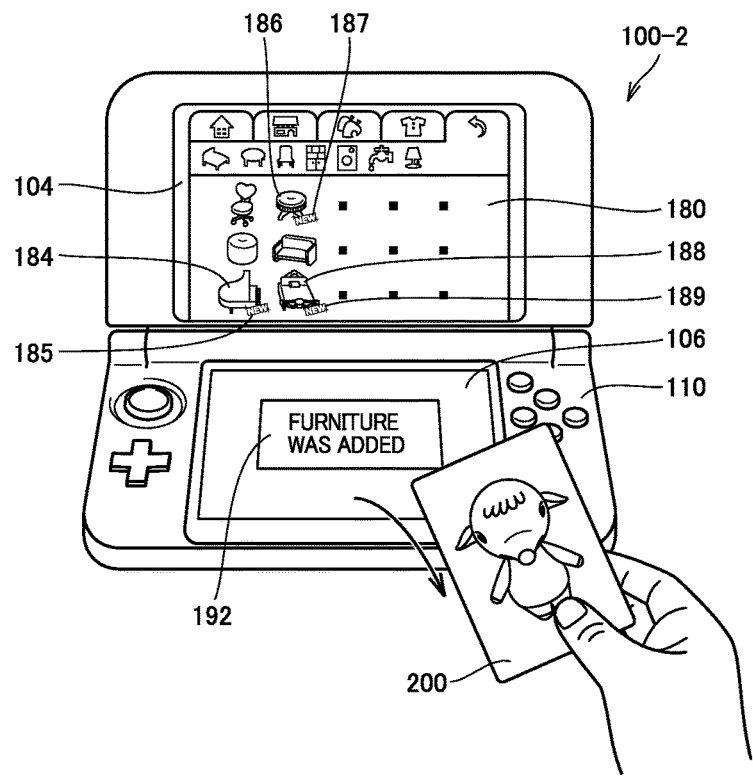

Here, as shown in FIG. 4B, when the user holds any RF tag 200 over information processing apparatus 100-2, information on available objects is read from RF tag 200 and list display on list screen 180 is updated. Namely, information processing apparatus 100-2 has an updating function to update availability of an object in information processing apparatus 100-2 based on information on available furniture objects, which is available content information and has been read from RF tag 200 representing the information storage medium.

More specifically, RF tag 200 stores information corresponding to each of a piano, a chair, and a bed shown in FIG. 3A, and as information processing apparatus 100-2 reads stored information from RF tag 200, objects 184, 186, and 188 are added in list screen 180.

In information processing apparatus 100-2, a notification that information on an available object has been read from RF tag 200 is given. Namely, second display portion 106 displays a message 192 "furniture was added."

Thus, in information processing apparatus 100-1, information on an available furniture object is written in RF tag 200, and in information processing apparatus 100-2 different from information processing apparatus 100-1, availability of an available furniture object is updated with information on available furniture objects read from RF tag 200 being reflected. Thus, by exchanging available content information among a plurality of information processing apparatuses 100 (that is, among a plurality of users) through RF tag 200 representing the information storage medium, user's fun with a game application is various, and communication with other users can also be promoted.

Though a configuration in which information processing apparatus 100-1 has the writing function to write available content information in the information storage medium and information processing apparatus 100-2 has the reading function to read available content information from the information storage medium and the updating function to update availability of a content based on the available content information read from the information storage medium has been exemplified for the sake of convenience in the description with reference to FIGS. 3A to 3C and 4A to 4B, the roles may be interchanged between information processing apparatus 100-1 and information processing apparatus 100-2. Namely, both of information processing apparatus 100-1 and information processing apparatus 100-2 preferably have all of the reading function, the writing function, and the updating function.

When exchange of data in connection with a plurality of information processing apparatuses 100 is described in the description below, as necessary, information processing apparatus 100-1 writes available content information in RF tag 200, and information processing apparatus 100-2 reads available content information from RF tag 200 and updates availability of a content based on the available content information.

[D. Mount Example of Information Storage and Information Merge]

A mount example of an available content written in RF tag 200 and information merge in information processing apparatus 100 will now be described.

(d1: First Mount Example)

Figure 5:
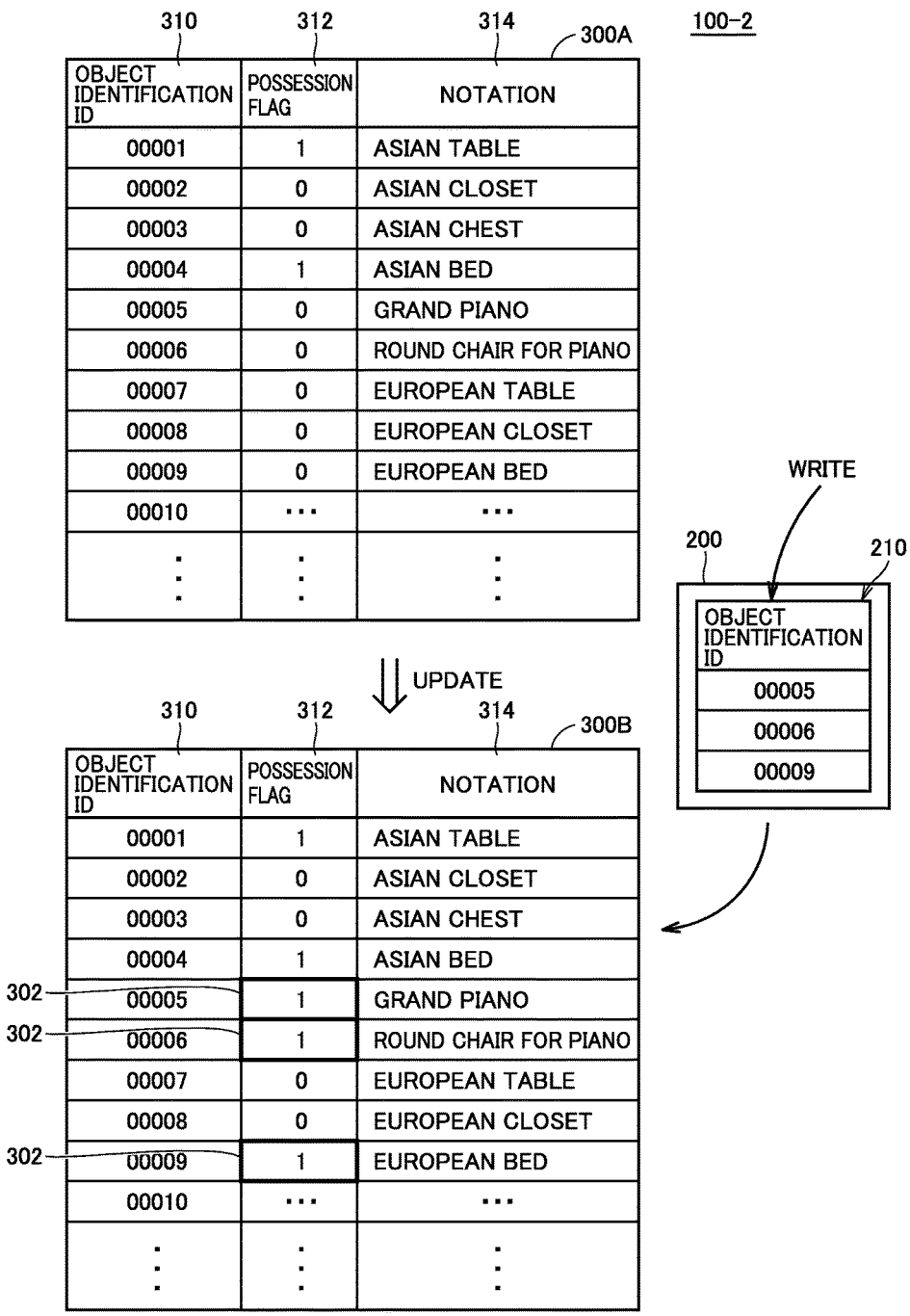
FIG. 5 shows an exemplary illustrative non-limiting drawing illustrating a first mount example of information storage and information merge in the information processing system according to the present embodiment.

FIG. 5 is a diagram for illustrating a first mount example of information storage and information merge in information processing system 1 according to the present embodiment. Referring to FIG. 5, information processing apparatus 100-2 holds and manages an object management table 300A. Object management table 300A includes an object identification ID column 310, a possession flag column 312, and a notation column 314.

In a field of object identification ID column 310 in each row, identification information for specifying each furniture object (hereinafter also referred to as "object identification information" for distinction from other types of identification information) is stored.

In a field of possession flag column 312 in each row, a flag for determining whether or not an object (that is, an object specified by object identification information stored in the field of object identification ID column 310 in the row) corresponding to the row is available is stored. In the example shown in FIG. 5, "1" indicates being available, and "0" indicates being unavailable. Namely, possession flag column 312 stores a flag indicating availability of each content.

In a field of notation column 314 in each row, an object name (a notation) displayed together at the time when an object corresponding to the row is displayed is stored. Notation column 314 is not necessarily required. For example, when a part of data on an object specified by the object identification information stored in the field of object identification ID column 310 includes information such as a notation, such partial data may be used to display an object as appropriate.

Available content information written in RF tag 200 from information processing apparatus 100-1 includes an identification information data set 210 including object identification information on an available object. Namely, one piece of object identification information or a plurality of pieces of object identification information for specifying one available object or a plurality of available objects is/are written in RF tag 200 as identification information data set 210. Thus, identification information data set 210 includes unique object identification information for specifying a content to be changed to being available.

Information processing apparatus 100-2 updates a content in object management table 300A based on identification information data set 210 read from RF tag 200. In the example shown in FIG. 5, a value in possession flag column 312 in each row, which corresponds to object identification information included in identification information data set 210 in object management table 300A, is changed from "0" to "1" (see three reference numerals 302). Namely, information processing apparatus 100-2 updates an object corresponding to object identification information included in identification information data set 210 stored in RF tag 200 from an unavailable state to an available state. As a result of such updating processing, object management table 300A is changed as seen as an object management table 300B.

By adopting identification information data set 210 as shown FIG. 5, available content information can be exchanged even though an area of RF tag 200 for storing data is small.

(d2: Second Mount Example)

Figure 6:
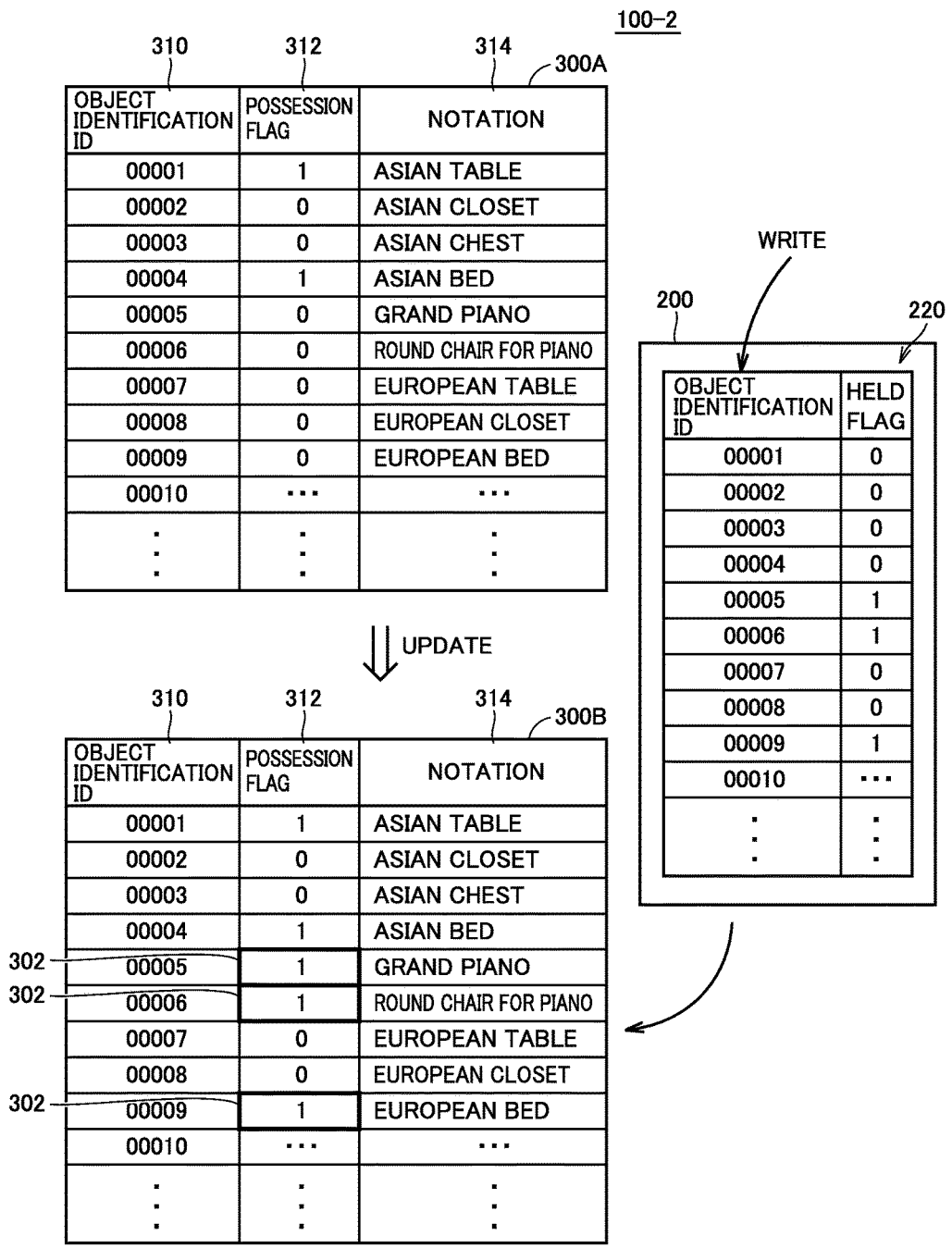
FIG. 6 shows an exemplary illustrative non-limiting drawing illustrating a second mount example of information storage and information merge in the information processing system according to the present embodiment.

FIG. 6 is a diagram for illustrating a second mount example of information storage and information merge in information processing system 1 according to the present embodiment. The second mount example shown in FIG. 6 is different from the first mount example shown in FIG. 5 in data structure stored in RF tag 200. More specifically, RF tag 200 stores an object management table 220. Object management table 220 is provided with an area for storing a flag for determining whether or not each object is available, for objects as many as objects defined in object management table 300A.

Information processing apparatus 100-1 prepares object management table 220 in which a possession flag corresponding to one available object or a plurality of available objects is set to "1", and writes the object management table into RF tag 200. Thus, object management table 220 includes all available states for each object.

Information processing apparatus 100-2 reads object management table 220 from RF tag 200, and updates contents in object management table 300A based on read object management table 220. In typical processing, information processing apparatus 100-2 calculates a logical sum, for each corresponding piece of data, of a data column of possession flag column 312 in object management table 300A and a data column of possession flag column 312 in object management table 220, and outputs object management table 300B.

By adopting object management table 220 as shown in FIG. 6, processing for updating from object management table 300A to object management table 300B can further be simplified and higher in speed.

(d3: Initial Setting of Object Management Table)

Though description of the mount examples shown in FIGS. 5 and 6 has been given on the premise that object management table 300A is given, a predetermined content may uniformly be determined as initial setting of object management table 300A (availability of a content before updating), or initial setting of object management table 300A may dynamically be determined based on various types of information (for example, a status of a user who makes use of an application). A method of dynamically determining initial setting of object management table 300A in accordance with a type of RF tag 200 will be described by way of example.

As described with reference to FIGS. 3A to 3C and 4A to 4B, typically, one of a plurality of characters which are available in an application is depicted in advance on the surface of RF tag 200. RF tag 200 stores object identification information corresponding to the character depicted on the surface. For example, the user can perform a setting operation before start of the application or during execution of the application. The user can operate the selected character on information processing apparatus 100. Alternatively, the user may be able to set a character depicted on the surface of RF tag 200 as a character to be operated by the user himself/herself by holding any RF tag 200 over information processing apparatus 100.

In this setting operation, information processing apparatus 100 may initially set object management table 300A based on card identification information read from RF tag 200.

Figures 7A, 7B:
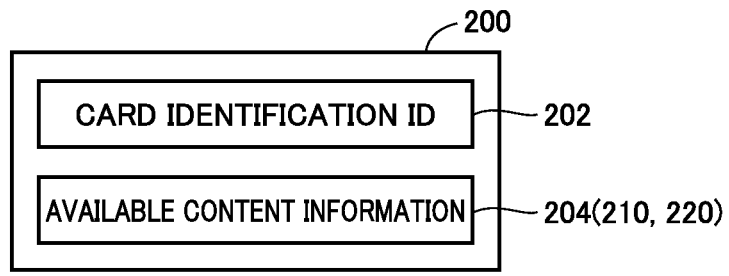
FIGS. 7A and 7B show exemplary illustrative non-limiting drawings illustrating examples of a data structure for implementing initial setting of an object management table in the information processing system according to the present embodiment.

FIG. 7A shows one example of a data structure of RF tag 200, and FIG. 7B shows one example of a data structure of an object management table group 300 held by information processing apparatus 100.

Referring to FIG. 7, RF tag 200 stores a card identification ID 202 which is information for specifying a type of each RF tag 200 and available content information 204. For card identification ID 202, a value corresponding to a character depicted on the surface of RF tag 220 storing the card identification ID is set. Available content information 204 includes identification information data set 210 shown in FIG. 5 or object management table 220 shown in FIG. 6.

Referring to FIG. 7B, information processing apparatus 100 holds object management table group 300 consisting of object management tables as many as types of RF tag 200. In a card identification ID field 320 in each object management table included in object management table group 300, a value corresponding to card identification ID 202 which can be set in RF tag 200 is stored. When information processing apparatus 100 reads a value for a card identification ID from any RF tag 200, it selects an object management table in which a value the same as the read value is set in card identification ID field 320. Then, information processing apparatus 100 determines a content in the selected object management table as an initial set value in object management table 300A.

Through such setting processing, a content for initial setting of object management table 300A can dynamically be determined in accordance with a type of RF tag 200.

RF tag 200 used by the user in the setting operation and RF tag 200 used for processing for updating availability of an object as described above do not have be the same. Namely, in the setting operation, a content for initial setting of object management table 300 may be determined based on a card identification ID stored in first RF tag 200, and in subsequent updating processing, availability of a content may be updated based on available content information 204 stored in second RF tag 200.

Alternatively, in a configuration to the contrary, availability of an object cannot be updated unless RF tag 200 is of the same type as RF tag 200 used for the setting operation.

As set forth above, with the updating function according to the present embodiment, in addition to available content information 204 stored in RF tag 200 representing the information storage medium, availability of a content may be updated based on content information determined in accordance with a type of RF tag 200 (object management table 300A).

In a yet another mount example, all objects may be set to unavailable in initial setting of object management table 300A. In this case, availability of a content is updated substantially based only on available content information 204 read from RF tag 200.

(d4: Output of Availability of Content)

An output function to output updated availability of a content obtained as a result of the updating processing described above (object management table 300B shown in FIGS. 5 and 6) to information processing apparatus 100 may be mounted. A typical example of such an output function includes a method of visually expressing availability of a content on first display portion 104 and/or second display portion 106.

As described with reference to FIGS. 5 and 6, an originally available object defined in object management table 300A and an object which has been made available as it is defined in available content information 204 (identification information data set 210 in FIG. 5 or object management table 220 in FIG. 6) stored in RF tag 200 may be present. In such a case, with which method each object has been made available may be output in an identifiable state. For example, when updated availability of a content is output to first display portion 104 and/or second display portion 106, as shown in FIG. 4B, sub objects "NEW" 185, 187, and 189 may be displayed in proximity to or as partially superimposed on objects 184, 186, and 188, respectively, which have been made available based on available content information 204 stored in RF tag 200. By displaying such a sub object together with an object, the user can know at a glance which object has been made available by holding RF tag 200 over.

Thus, when the output function to output updated availability of a content is mounted, by which of available content information 204 stored in RF tag 200 representing the information storage medium and content information determined in accordance with a type of RF tag 200 (object management table 300A) each available content has been made available may be output in an identifiable manner.

In another form of the output function, updated availability of a content may be output to another display apparatus, another information processing apparatus 100, or a server on a network through the network or any interface. In this case as well, information for identifying whether each object has been made available by available content information 204 stored in RF tag 200 representing the information storage medium or by content information determined in accordance with a type of RF tag 200 may be added.

[E. Processing Procedure]

Figure 8:
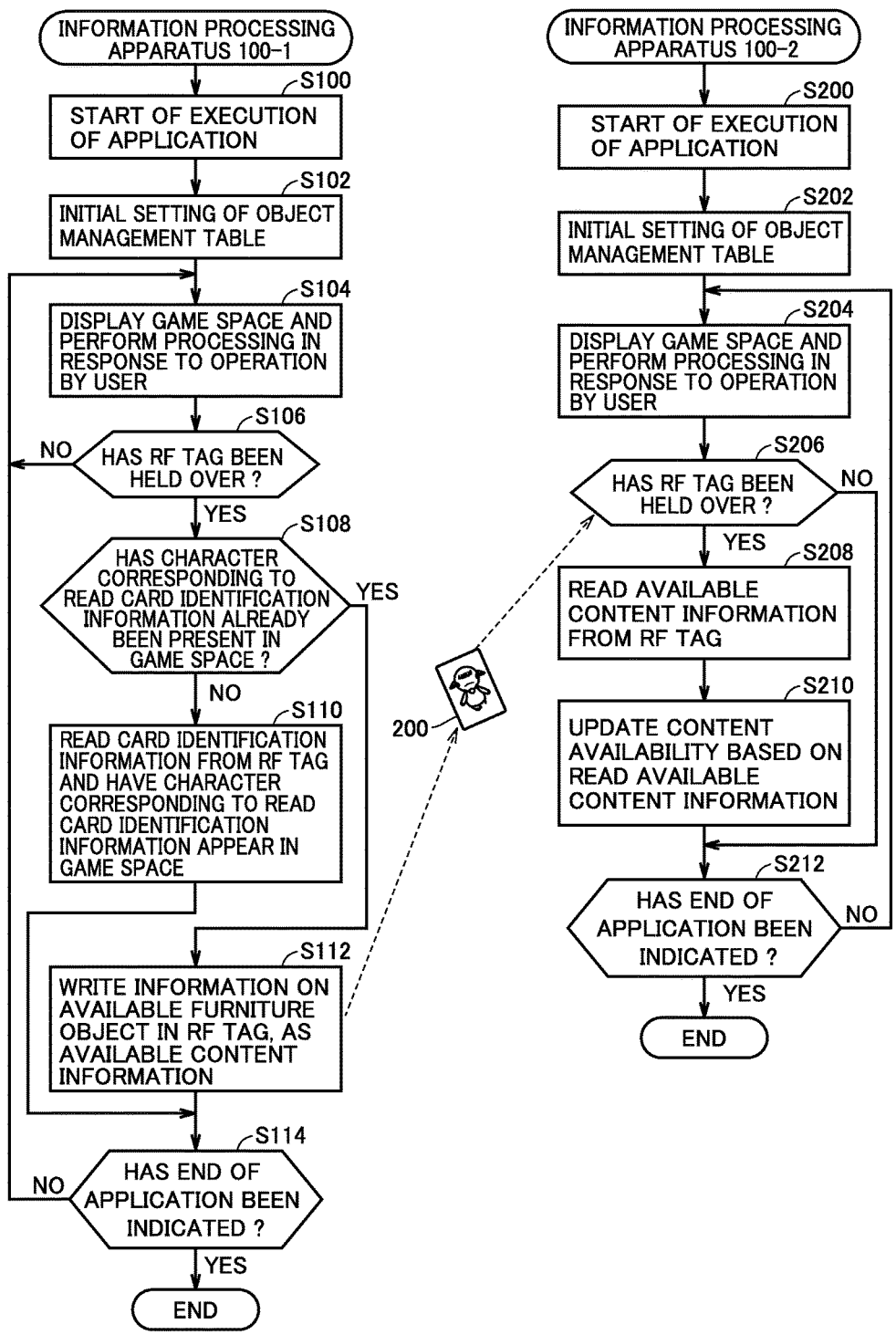
FIG. 8 shows an exemplary illustrative non-limiting drawing illustrating a flowchart showing a procedure in processing of an application executed in the information processing system according to the present embodiment.

FIG. 8 is a flowchart showing a procedure in processing of an application executed in information processing apparatus 1 according to the present embodiment. Each step shown in FIG. 8 is typically implemented as CPU 102 (FIG. 1) of each of information processing apparatus 100-1 and information processing apparatus 100-2 executes an information processing program.

When execution of an application is started in information processing apparatus 100-1 (step S100), an object management table in information processing apparatus 100-1 is initially set (step S102). In succession, information processing apparatus 100-1 displays a game space as shown in FIG. 3A and performs processing in response to an operation by a user (step S104).

Then, information processing apparatus 100-1 determines whether or not RF tag 200 has been held over (step S106). When the user has not held RF tag 200 over information processing apparatus 100-1 (NO in step S106), processing in step S104 or later is repeated.

When the user has held RF tag 200 over information processing apparatus 100-1 (YES in step S106), information processing apparatus 100-1 reads card identification information from RF tag 200 and determines whether or not a character corresponding to the read card identification information has already been present in the game space (step S108).

When the character corresponding to the read card identification information has not yet been present in the game space (NO in step S108), information processing apparatus 100-1 reads card identification information from RF tag 200 and has the character corresponding to the read card identification information appear in the game space (step S110).

When the character corresponding to the read card identification information has already been present in the game space (YES in step S108), information processing apparatus 100-1 writes information on an available furniture object into RF tag 200 as available content information (step S112). RF tag 200 in which this available content information has been written can also be used freely for information processing apparatus 100-2 by the user.

After step S110 is performed or step S112 is performed, information processing apparatus 100-1 determines whether or not end of the application has been indicated (step S114). When end of the application has not been indicated (NO in step S114), processing in step S104 or later is repeated. When end of the application is indicated (YES in step S114), execution of the application in information processing apparatus 100-1 ends.

In contrast, when execution of the application is started in information processing apparatus 100-2 (step S200), an object management table in information processing apparatus 100-2 is initially set (step S202). In succession, information processing apparatus 100-2 displays the game space as shown in FIG. 4A and performs processing in response to an operation by the user (step S204).

Then, information processing apparatus 100-2 determines whether or not RF tag 200 has been held over (step S206). When the user holds RF tag 200 over information processing apparatus 100-2 (YES in step S206), information processing apparatus 100-2 reads available content information from RF tag 200 (step S208). Then, information processing apparatus 100-2 updates availability of a content based on the read available content information (step S210).

Then, information processing apparatus 100-2 determines whether or not end of the application has been indicated (step S212). When end of the application has not been indicated (NO in step S212), processing in step S204 or later is repeated. When end of the application is indicated (YES in step S212), execution of the application in information processing apparatus 100-2 ends.

Though FIG. 8 shows processing for writing in information processing apparatus 100-1 as well as processing for reading and processing for updating in information processing apparatus 100-2 separately for the sake of convenience of description, a single information processing apparatus 100 may be configured to be able to perform any of the steps performed in each information processing apparatus 100.

[F. Additional Function and Processing]

Additional functions and processing as below may be added to information processing system 1 according to the present embodiment. A plurality of functions and processing arbitrarily selected from among functions and processing below may be mounted as combined as appropriate.

(f1: Selection of Object to Be Written by User)

In the embodiment described above, a mount example in which a displayed furniture object is automatically written in RF tag 200 as available content information at the time when RF tag 200 is held over information processing apparatus 100 in the state as shown in FIG. 3B or 3C has been exemplified. When the number of displayed objects is large or when a size of available content information which can be written in RF tag 200 is restricted, a user may be able to select an object to be written as available content information.

Figure 9:
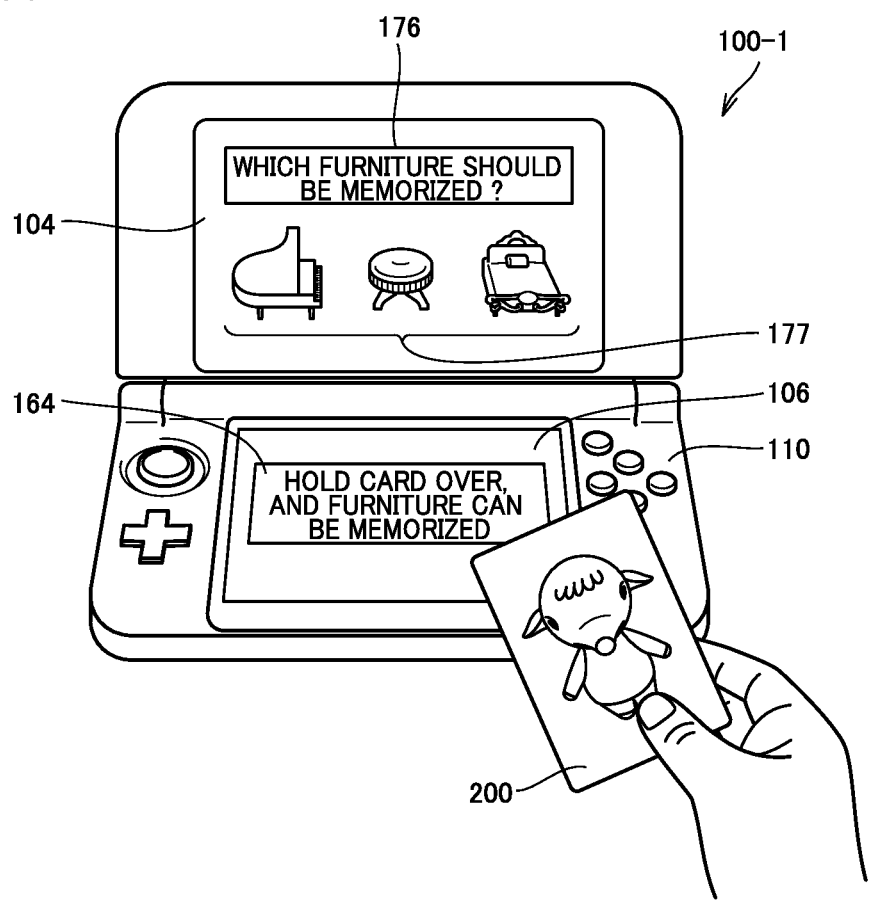
FIG. 9 shows an exemplary illustrative non-limiting drawing illustrating one example of processing for selecting an object to be written, in the application to which information processing according to the present embodiment is applied.

FIG. 9 is a schematic diagram showing one example of processing for selecting an object to be written, in the application to which information processing according to the present embodiment is applied. In a state shown in FIG. 9, information on an available furniture object is ready for being written as available content information into information processing apparatus 100-1. Here, second display portion 106 of information processing apparatus 100-1 displays a message 164 "hold card over, and furniture can be memorized."

When the user holds any RF tag 200 over information processing apparatus 100-1 in this state, the user is invited to select which object is to be written in RF tag 200 as available content information. Specifically, first display portion 104 displays a message 176 "which furniture should be memorized?" and an object candidate 177 to be written. The user operates input portion 110 so as to select an object to be written. This selected object is written in RF tag 200 as available content information.

Thus, the writing function of information processing apparatus 100 has information on one content or a plurality of contents selected in response to a selection instruction written in RF tag 200 representing the information storage medium as available content information.

By having the user select an object to be written as described above, even though a storage capacity of RF tag 200 is restricted, such a situation is more readily addressed. Since an object selected by the user himself/herself is written in RF tag 200 as available content information, user's fun can be enhanced by freely selecting an object which is desired to be available.

(f2: Management of the Number of Times of Reading or Frequency of Reading from RF Tag 200)

In the embodiment described above, availability of an object in any information processing apparatus 100 can be updated owing to the writing function and the updating function. The number of information processing apparatuses 100 in which availability of an object is updated may or may not be restricted. When the number is not restricted, once available content information is written in RF tag 200, availability of an object can be updated in any number of information processing apparatuses 100. By not imposing restriction, communication loops among users can more readily be developed.

When the number of times of writing or a frequency of writing (for example, the number of times of writing allowed in one day) is restricted, construction of communication more intimate among users can be promoted. "Rare" feeling can also be created for an object such as an item. A mount example in which the number of times of reading or a frequency of reading from RF tag 200 is restricted will be described below.

Figure 10:
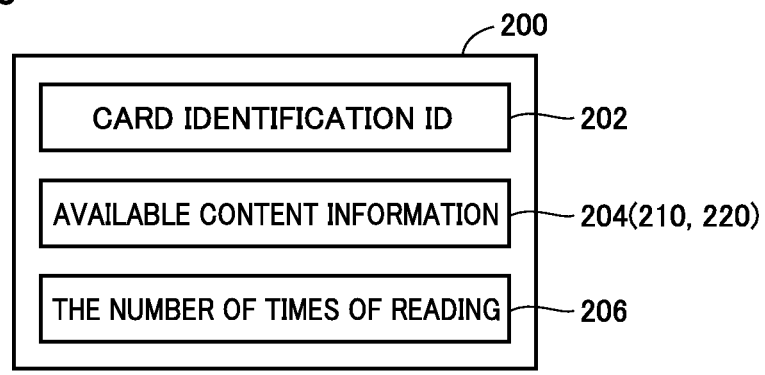
FIG. 10 shows an exemplary illustrative non-limiting drawing illustrating a configuration example for restricting the number of times of reading or a frequency of reading in the application to which information processing according to the present embodiment is applied.

FIG. 10 is a schematic diagram showing a configuration example for restricting the number of times of reading or a frequency of reading, in the application to which information processing according to the present embodiment is applied. Referring to FIG. 10, RF tag 200 stores the number of times of reading 206 in addition to card identification ID 202 and available content information 204 which are information for specifying a type of each RF tag 200.

In the number of times of reading 206, the total number of reading of available content information 204 from RF tag 200 or the number of reading within a prescribed period of time is stored. Typically, a value for the number of times of reading 206 is updated when available content information 204 is read from RF tag 200 owing to the reading function of information processing apparatus 100-2. With the reading function of information processing apparatus 100-2, whether or not a value for the number of times of reading 206 satisfies a predetermined condition is determined, and only when the condition is satisfied, reading of available content information 204 from RF tag 200 is allowed.

Such a condition that a value for the number of times of reading 206 has not reached a predetermined upper limit value or an effective value has been set for the number of times of reading 206 is assumed as the predetermined condition.

Thus, RF tag 200 representing the information storage medium stores the number of times of reading 206 representing management information for managing the number of times of reading owing to the reading function in correspondence with available content information 204. Then, the reading function of information processing apparatus 100-2 allows reading of available content information 204 from RF tag 200 when a value for the number of times of reading 206 stored in RF tag 200 satisfies a predetermined condition.

By adopting such a configuration, when such a system that communication can be established to allow also other users to use an object which can be used by a certain user is constructed, a system operator can appropriately manage an extent of distribution of an object.

(f3: Management of the Number of Times of Writing or Frequency of Writing in RF Tag 200)

In the embodiment described above, an object actually displayed on a screen or an object selected by a user among predetermined objects is set as an object to be written as available content information. In addition to such a configuration, for example, a user who has more positively communicated with other users may be allowed to write more types of objects as available content information.

In contrast, the number of times or a frequency that each of a plurality of types of predetermined objects can be written as available content information may be restricted.

Namely, with the writing function of information processing apparatus 100-1, the number of contents which can be included in available content information may be varied in accordance with the number of times of writing or a frequency of writing of available content information into RF tag 200.

FIG. 11 is a schematic diagram showing a configuration example for restricting the number of times of writing or a frequency of writing, in the application to which information processing according to the present embodiment is applied. Referring to FIG. 11, information processing apparatus 100-1 holds the number of times of writing 330 in addition to an object management table 300C.

Object management table 300C includes a write permission flag column 316 in addition to object identification ID column 310, possession flag column 312, and notation column 314. In a field of write permission flag column 316 in each row, a flag indicating whether or not an object corresponding to the row can be written in RF tag 200 as available content information is stored. In the example shown in FIG. 11, "1" indicates that writing is allowed, and "0" indicates that writing is not allowed.

In the number of times of writing 330, the total number of writing of available content information in RF tag 200 or the number of times of writing within a prescribed period of time is stored. Typically, a value for the number of times of writing 330 is updated when the writing function of information processing apparatus 100-1 had available content information written in RF tag 200. With the writing function of information processing apparatus 100-1, whether or not a value for the number of times of writing 330 satisfies a predetermined condition is determined, and when the condition is satisfied, processing corresponding to that condition is performed.

FIG. 11 shows, as processing corresponding to the condition, processing for changing a value for write permission flag column 316 corresponding to entry of some objects included in object management table 300C from "0" to "1" when the value for the number of times of writing 330 increases from "1" to "2". Namely, when the number of times of writing 330 exceeds a predetermined threshold value, an object which has not originally been allowed to be written as available content information is written as available content information (see a reference numeral 317). Information processing apparatus 100-1 holds an object management table 300D generated as a result of change in value in write permission flag column 316.

In contrast to the processing shown in FIG. 11, a value for some objects in write permission flag column 316 may be changed from "1" to "0" when the value for the number of times of writing 330 increases from "1" to "2". Namely, when the number of times of writing 330 exceeds a predetermined threshold value, an object which has originally been allowed to be written as available content information can no longer be written as available content information.

By increasing the number of contents which can be included in available content information in accordance with the number of times of writing or a frequency of writing of available content information into RF tag 200 as described above, a motivation to further activate communication among users is created. In contrast, by decreasing the number of contents which can be included in available content information in accordance with the number of times of writing or a frequency of writing of available content information into RF tag 200, a range of distribution of a specific object can be restricted so that "rare" feeling can also be created for an object such as an item.

(f4: Notification Before Writing into RF Tag 200)

For example, when a user has a plurality of RF tags 200, it is difficult to identify at a glance whether or not availability of an object has been updated with each RF tag 200. Therefore, a case that, in spite of writing of some kind of available content information into certain RF tag 200, another piece of available content information may be written without using the available content information is also assumed.

Then, with the writing function of information processing apparatus 100, the user may be notified unless previously written available content information has been read owing to the reading function of any information processing apparatus 100 before available content information is written in RF tag 200 representing the information storage medium. Here, whether or not available content information has been read may be determined based on the number of times of reading 206 stored in RF tag 200 shown in FIG. 10.

Figure 12:
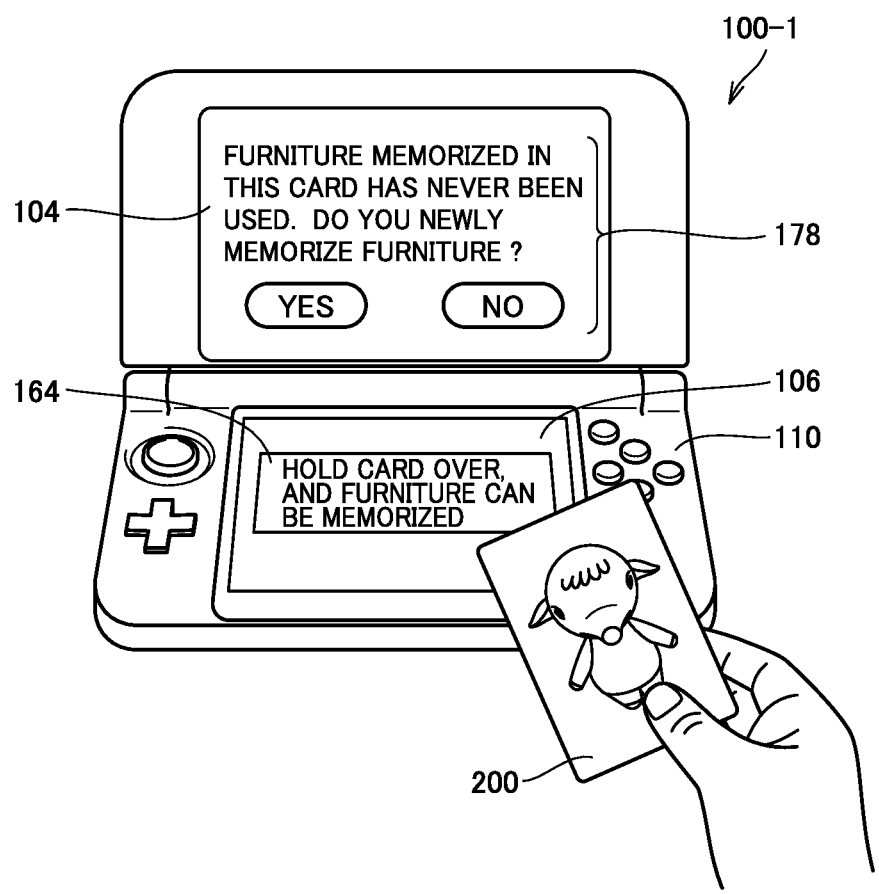
FIG. 12 shows an exemplary illustrative non-limiting drawing illustrating a notification example before writing in an RF tag, in the application to which information processing according to the present embodiment is applied.

FIG. 12 is a schematic diagram showing a notification example before writing in an RF tag, in the application to which information processing according to the present embodiment is applied. Referring to FIG. 12, for example, when the user holds RF tag 200 over information processing apparatus 100-1 in the state as shown in FIG. 3B or 3C, information processing apparatus 100-1 reads a value for the number of times of reading 206 (see FIG. 10) stored in RF tag 200. When the read value for the number of times of reading 206 is set to "0", it is determined that available content information has not yet been read. When such determination is made, a notification to a user is given. Specifically, first display portion 104 of information processing apparatus 100-1 displays a message 178 "Furniture memorized in this card has never been used. Do you newly memorize furniture?" The user indicates whether or not to continue writing of available content information into RF tag 200 by operating input portion 110. Information processing apparatus 100-1 determines whether or not writing into RF tag 200 is to be continued in response to an instruction from the user.

By giving a notification before writing into RF tag 200 as described above, erroneous overwrite of available content information which has never been used can be prevented.

(f5: Object of Which Writing into RF Tag 200 is Restricted)

Some restriction may be imposed on a content which can be included in available content information. Namely, a content of which inclusion in available content information is not permitted may be predetermined. For example, a specific object among a plurality of objects may not be included in available content information. By setting such restriction, "rare" feeling can be created for an object such as a specific item.

FIG. 13 is a schematic diagram showing a configuration example for restricting inclusion of a specific object in available content information, in the application to which information processing according to the present embodiment is applied. Referring to FIG. 13, an object management table 300E managed by information processing apparatus 100 includes a writing prohibition flag column 318 in addition to object identification ID column 310, possession flag column 312, and notation column 314. In a field of writing prohibition flag column 318 in each row, a flag indicating whether or not an object corresponding to the row can be included in available content information is stored. In the example shown in FIG. 13, "1" indicates prohibition of writing and "0" indicates non-prohibition of writing.

Though FIG. 13 shows a configuration in which an individual flag indicating whether or not prohibition of writing is set for each object is provided, write permission flag column 316 shown in FIG. 11 may be used to set whether or not to similarly prohibit writing.

[G. Advantage]

The conventional technique has merely been such that identification information allocated to an IC tag itself is read to set one flag associated with the IC tag so that data or an item can be used. In contrast, in the present embodiment, such processing that content information possible in certain information processing apparatus 100 is stored in RF tag 200 and another information processing apparatus 100 reads the content information, so that, for example, an object the same as an object arranged in the virtual space of information processing apparatus 100 can also be made use of in another information processing apparatus 100 is enabled.

With such a function, communication among a plurality of users can be more smooth.

While certain example systems, methods, devices, and apparatuses have been described herein, it is to be understood that the appended claims are not to be limited to the systems, methods, devices, and apparatuses disclosed, but on the contrary, are intended to cover various modifications and equivalent arrangements included within the spirit and scope of the appended claims.

What is claimed is:

1. A non-transitory storage medium encoded with a computer readable information processing program executed by, at least, a first information processing apparatus, the first information processing apparatus including communication circuitry configured to exchange data with an information storage medium through near field wireless communication and to communicate with at least a second information processing apparatus, the first information processing apparatus and the second information processing apparatus are configured to store a plurality of pieces of object data for use in a game executed by the first and second information processing apparatuses, and whether object data, from the plurality of pieces of object data, is available in the game is set in each of the first and second information processing apparatuses based on identification information and flag information associated with the plurality of pieces of object data, the information processing program causing at least the first information processing apparatus and/or the second information processing apparatus to perform execution comprising:

recording available content information in the information storage medium corresponding to at least one piece of object data, from the plurality of pieces of object data, stored in a memory of the first information processing apparatus, the available content information including the identification information and the flag information;

reading the available content information from the information storage medium; and setting the object data, corresponding to the available content information, among the plurality of pieces of object data stored in the second information processing apparatus to an available state based on the identification information and the flag information, wherein the information storage medium is configured to record, by the first information processing apparatus, available content information corresponding to different types of object data, among the plurality of pieces of object data, stored in the first information processing apparatus.

2. The non-transitory storage medium according to claim 1, wherein recording the available content information includes writing in the information storage medium, information on an object displayed on a screen, among objects in the virtual space.

3. The non-transitory storage medium according to claim 2, wherein recording the available content information includes writing in the information storage medium, the information on the object displayed on the screen when an instruction for writing is accepted, among the objects in the virtual space.

4. The non-transitory storage medium according to claim 1, wherein availability of the content is updated based on content information determined in accordance with a type of the information storage medium, in addition to the available content information stored in the information storage medium.

5. The non-transitory storage medium according to claim 4, wherein the updated availability of the content is output, and the output further includes outputting in an identifiable manner, by which of the available content information stored in the information storage medium and the content information determined in accordance with the type of the information storage medium each available content has become available.

6. The non-transitory storage medium according to claim 1, wherein information on one content or the plurality of contents selected in response to a selection instruction, as the available content information, is written in the information storage medium.

7. The non-transitory storage medium according to claim 1, wherein the information storage medium stores management information for managing the number of times of reading in correspondence with the available content information, and the available content information is read from the information storage medium when the management information stored in the information storage medium satisfies a predetermined condition.

8. The non-transitory storage medium according to claim 1, wherein the number of contents which can be included in the available content information is changed in accordance with the number of times of writing or a frequency of writing of the available content information in the information storage medium.

9. The non-transitory storage medium according to claim 1, wherein a user is notified when previously written available content information has not been read before the available content information is written in the information storage medium.

10. The non-transitory storage medium according to claim 1, wherein a content which is not permitted to be included in the available content information is predetermined.

11. The non-transitory storage medium according to claim 1, wherein the near field wireless communication is near field communication (NFC).

12. The non-transitory storage medium according to claim 1, wherein the flag information is used to determine whether the object appearing in the virtual space is available or unavailable.

13. The non-transitory storage medium according to claim 1, wherein the identification information and the flag information are stored in a data structure, and each identification information is associated with a corresponding flag information in the data structure.

14. The non-transitory storage medium according to claim 1, wherein the object data selected from among the different types of object data stored in the first information processing apparatus is written in the information storage medium.

15. The non-transitory storage medium according to claim 14, wherein the object data includes an object in a virtual space managed through information processing.

16. An information processing system comprising:
a first information processing apparatus; and
a second information processing apparatus, each of the first and second information processing apparatuses including communication circuitry configured to exchange data with an information storage medium through near field wireless communication,
the first information processing apparatus and the second information processing apparatus are configured to store a plurality of pieces of object data for use in a game executed by the first and second information processing apparatuses, and whether object data, from the plurality of pieces of object data, is available in the game is set in each of the first and second information processing apparatuses based on identification information and flag information associated with the plurality of pieces of object data, and
the first information processing apparatus configured to record available content information in the information storage medium corresponding to at least one piece of object data, from the plurality of pieces of object data, stored in a memory of the first information processing apparatus, the available content information including the identification information and the flag information, and
the second information processing apparatus configured to:
read the available content information from the information storage medium; and
set the object data, corresponding to the available content information, among the plurality of pieces of object data stored in the second information processing apparatus to an available state based on the identification information and the flag information,
wherein the information storage medium is configured to record, by the first information processing apparatus, available content information corresponding to different types of object data, among the plurality of pieces of object data, stored in the first information processing apparatus.

17. A first information processing apparatus, comprising:
communication circuitry configured to exchange data with an information storage medium through near field wireless communication and to communicate with at least a second information processing apparatus;
a memory configured to store a plurality of pieces of object data for use in a game, and whether object data, from the plurality of pieces of object data, is available in the game is set in each of the first and second information processing apparatuses based on identification information and flag information associated with the plurality of pieces of object data; and
processing circuitry configured to:
record available content information in the information storage medium corresponding to at least one piece of object data, from the plurality of pieces of object data, the available content information including the identification information and the flag information;
read the available content information from the information storage medium; and
set the object data, corresponding to the available content information, among the plurality of pieces of object data to an available state based on the identification information and the flag information,
wherein the information storage medium is configured to record, by the first information processing apparatus, available content information corresponding to different types of object data, among the plurality of pieces of object data, stored in the first information processing apparatus.

18. An information processing method performed between a first information processing apparatus and a second information processing apparatus, each of the first and second information processing apparatuses including communication circuitry configured to exchange data with an information storage medium through near field wireless communication, and configured to store a plurality of pieces of object data for use in a game executed by the first and second information processing apparatuses, and whether object data, from the plurality of pieces of object data, is available in the game is set in each of the first and second information processing apparatuses based on identification information and flag information associated with the plurality of pieces of object data, the method comprising:
recording available content information in the information storage medium corresponding to at least one piece of object data, from the plurality of pieces of object data, stored in a memory of the first information processing apparatus, the available content information including the identification information and the flag information;
reading the available content information from the information storage medium; and
setting the object data, corresponding to the available content information, among the plurality of pieces of object data stored in the second information processing apparatus to an available state based on the identification information and the flag information,
wherein the information storage medium is configured to record, by the first information processing apparatus, available content information corresponding to different types of object data, among the plurality of pieces of object data, stored in the first information processing apparatus.

* * * * *